Jan. 21, 1930. A. FORBERG 1,744,217
SECTIONAL BROACH
Filed Dec. 5, 1927
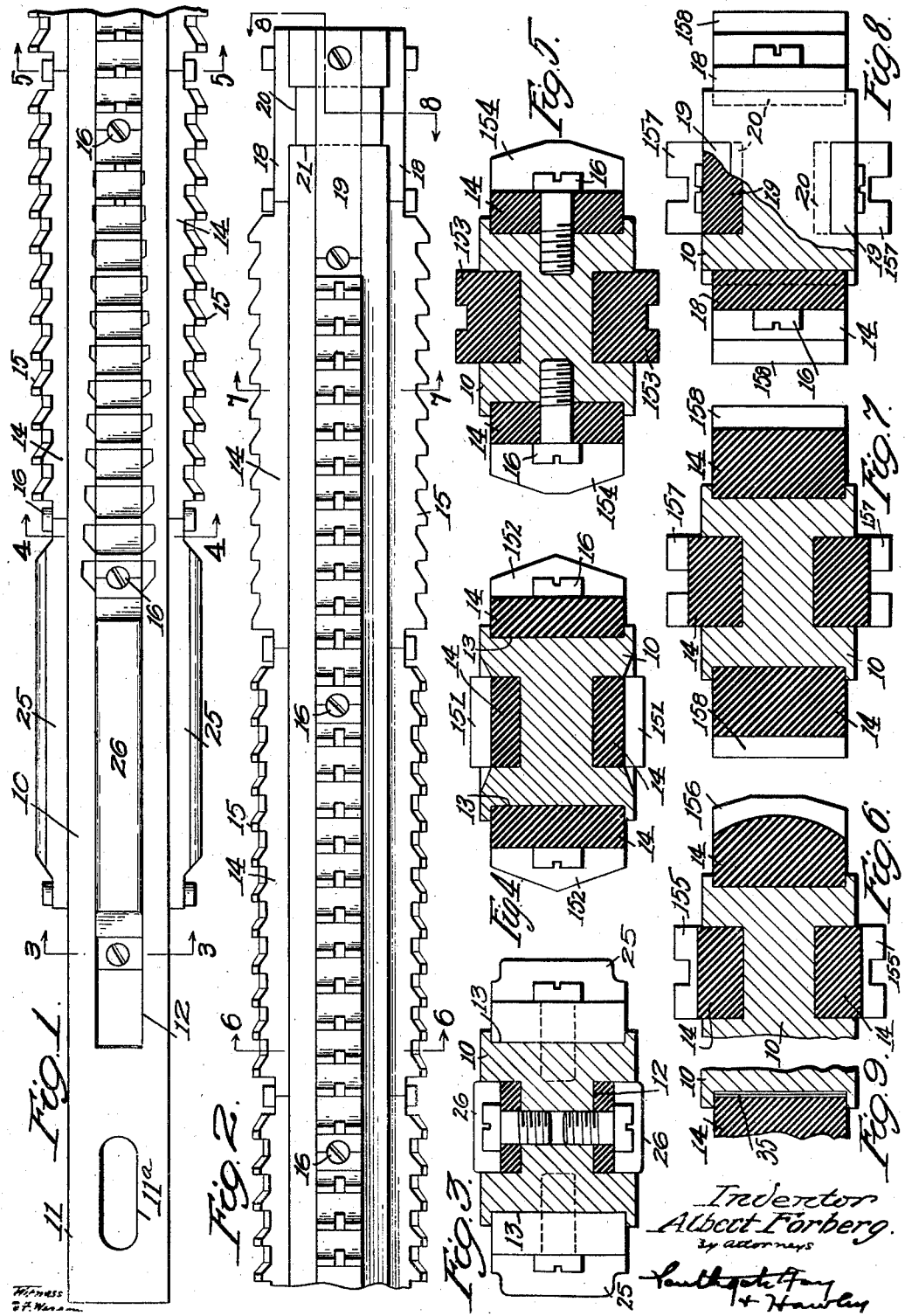

Patented Jan. 21, 1930

1,744,217

UNITED STATES PATENT OFFICE

ALBERT FORBERG, OF HUDSON, MASSACHUSETTS, ASSIGNOR TO THE LAPOINTE MACHINE TOOL COMPANY, OF HUDSON, MASSACHUSETTS, A CORPORATION OF MAINE

SECTIONAL BROACH

Application filed December 5, 1927. Serial No. 237,620.

This invention relates to a broach designed for use in finishing work by a relative cutting movement substantially longitudinal of the broach. Such broaches are subject to substantial wear, particularly when used in broaching cored holes, and it is a difficult and expensive matter to bring such broaches up to size after they have become worn.

It is the general object of my invention to provide a broach in which the cutting teeth are assembled in broaching units which may be easily removed and replaced. Further objects are to provide a construction in which the radial position of the broaching units may be conveniently adjusted, and to make effective provision to prevent axial displacement of the broaching units.

My invention further relates to arrangements and combinations of parts which will be hereinafter described and more particularly pointed out in the appended claims.

A preferred form of the invention is shown in the drawings in which—

Fig. 1 is a side elevation of one end portion of a broach embodying my improvements;

Fig. 2 is a corresponding view of the opposite end portion;

Figs. 3, 4, 5, 6 and 7 are transverse sectional views, taken along the line 3—3, 4—4, 5—5, 6—6 and 7—7 respectively in Figs. 1 and 2;

Fig. 8 is an end view of the broach, partly in section and taken along the line 8—8 in Fig. 2; and Fig. 9 is a detail partial sectional view to be described.

Referring to the drawings, my improved broach comprises a body portion or shaft 10 having an end portion 11 adapted to be received in the jaws of the draw head of a broaching machine and provided with a slot or opening 11ª fitted to receive a cross pin through which the pull of the draw head is transmitted to the broach. The construction thus far described is of the usual and standard form.

The body 10 of my improved broach is provided with longitudinal grooves 12 and 13 in the sides and edges thereof, adapted to receive broaching units 14, each comprising a longitudinally extended strip or bar fitting one of the grooves 12 or 13 and having a series of cutting teeth 15 formed thereon. A sufficient number of units 14 is provided to cover a desired length of the broach and these broaching units preferably abut against each other, as indicated in Figs. 1 and 2, and are provided with semi-circular recesses in their abutting ends, through which extend clamping screws 16, by which the units 14 are firmly retained in the grooves 12 and 13.

The end thrust of the broaching units 14 is taken by thrust blocks 18 and 19 (Figs. 2 and 8) which are provided with lugs or projections 20 seated in corresponding recesses 21 formed near the finish end of the broach body 10. At the opposite end of the broach I have provided guide units 25 and 26 adapted to enter the hole to be broached and to approximately locate the broach therein.

With this construction, the tooth outline of sucessive broaching units 14 may be varied if desired so as to broach a hole in a series of steps, changing the section of the hole as the work proceeds and thus relieving the broach of the excessive strain sometimes caused by attempting to broach the whole section of the hole at the same time.

Referring to Figs. 3 to 8, it will be noted that the guide-bars 25 and 26 (Fig. 3) have no cutting teeth but are merely adapted to enter the hole to be broached and to center the work on the broach.

In Fig. 4, the teeth 151 of the side broaching units 14 are rectangular in outline, but cut a groove of relatively slight depth, while the teeth 152 of the edge broaching unit 14 are of substantially V-shaped section and cut corresponding grooves.

In Fig. 5, the teeth 153 of the side broaching units are of greater depth than in Fig. 4 and are also provided with a recess portion leaving a rib in the work at the side of the hole. The teeth 154 in the edge broaching units are of greater depth and are flattened to a certain extent along the center of their cutting edges.

In Fig. 6, the teeth 155 of the side units are similar to the teeth 153 but the depth is still further increased and the outline of the edge teeth 156 still further approaches a rectangle.

In Fig. 7, the teeth 157 of the edge units are of still greater depth and provide a deeper rib along the center while the edge teeth 158 produce a rectangular groove, the teeth 157 and 158 representing the final or finished shape of the broached recesses on the four sides of a substantially rectangular opening.

It will be understood that the broach and the cutting teeth shown in the drawings are illustrative only and that the body of the broach may be of any desired shape and may be provided with any desired number of longitudinal grooves to receive broaching units having cutting teeth of any desired outline, my invention not being limited to any particular size or shape of broach or to the production of any particular outline of opening.

With this construction, it will be seen that the cutting teeth, instead of being formed direct from the body of the broach, are formed as separate broaching units, each comprising a plurality of cutting teeth. These units may be made in large quantities and of exactly duplicate dimensions, so that a worn or broken unit may be readily replaced by simply removing the adjacent screws 16, taking out the broken or worn unit, and inserting a fresh unit in place thereof.

In this way, the maintenance of exact size in a broach is greatly simplified and the expense thereof much reduced. Ordinarily in keeping a broach of my improved type up to size, it is sufficient to replace the last or finishing set of broaching units at the outer end of the broach, as the exact size and shape of the intermediate broach units is not of such great importance.

It is also possible to restore the broach to size by placing thin shims 35 (Fig. 9) in the bottoms of the grooves 12 and 13 to space the broaching units outward and thus increase their over-all dimensions. After being thus shimmed outward, they may be ground to sharpen them and restore their original dimensions if desired.

The expense of maintaining a broach at exact size is thus greatly reduced and it is possible to quickly repair a broach and restore it to operative condition without unduly delaying the operation thereof. It is also possible to broach odd or special holes, merely by providing a suitable series of broaching units while using a stock bar or shaft on which to mount said units.

Having thus described my invention and the advantages thereof, I do not wish to be limited to the details herein disclosed otherwise than as set forth in the claims, but what I claim is:—

1. A broach for finishing work by substantially longitudinal movement relative thereto comprises a supporting body having a longitudinal groove formed therein with a transverse depression near the following end of said groove, a plurality of broaching units detachably secured in said longitudinal groove, and a thrust block fitting in the following end portion of said longitudinal groove and having a lug fitting said transverse depression to resist the end thrust of said broaching units, and a clamping screw extending through said block into the supporting body.

2. A broach for finishing work by substantially longitudinal movement relative thereto which comprises a supporting body having external longitudinally extended grooves formed therein, a plurality of broaching units detachably secured in said grooves, means to resist end thrust on said broaching units and an enlongated detachable guiding member seated in the entering end portion of each longitudinal groove, said guiding members having smooth sides and top surfaces.

3. A broach for finishing work by substantially longitudinal movement relative thereto which comprises a supporting body having a plurality of external longitudinally extended grooves formed therein, with a transverse depression near the following end of each groove, broaching units detachably secured in said grooves, an enlongated detachable guiding member seated in the entering end portion of each longitudinal groove, said guiding members having smooth side and top surfaces, and a thrust block fitting in the following end portion of each longitudinal groove and having a lug fitting the transverse depression therein to resist the end thrust of said broaching units.

In testimony whereof I have hereunto affixed my signature.

ALBERT FORBERG.